(12) United States Patent
Russell

(10) Patent No.: US 9,310,829 B2
(45) Date of Patent: Apr. 12, 2016

(54) SYSTEM WITH FEATURE OF SAVING DYNAMIC POWER OF FLIP-FLOP BANKS

(71) Applicant: Andrew C. Russell, Austin, TX (US)

(72) Inventor: Andrew C. Russell, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 280 days.

(21) Appl. No.: 13/928,671

(22) Filed: Jun. 27, 2013

(65) Prior Publication Data

US 2015/0006944 A1  Jan. 1, 2015

(51) Int. Cl.
*G06F 1/08* (2006.01)
*G06F 1/32* (2006.01)

(52) U.S. Cl.
CPC .............. *G06F 1/08* (2013.01); *G06F 1/3203* (2013.01); *G06F 1/324* (2013.01)

(58) Field of Classification Search
CPC .............. G06F 1/00; G06F 1/04; G06F 1/12; G06F 1/26; G06F 1/32; G06F 11/30; G06F 15/16; G06F 1/08
See application file for complete search history.

(56) References Cited

U.S. PATENT DOCUMENTS

| 6,583,648 | B1 | 6/2003 | Cai | |
|---|---|---|---|---|
| 7,605,612 | B1 | 10/2009 | Chiang et al. | |
| 8,104,012 | B1 * | 1/2012 | Klein et al. | 716/132 |
| 8,126,079 | B1 * | 2/2012 | Tran et al. | 375/295 |
| 8,316,252 | B2 | 11/2012 | Mantor et al. | |
| 9,000,804 | B2 * | 4/2015 | Priel | G06F 1/3237 326/93 |

* cited by examiner

*Primary Examiner* — Thomas Lee
*Assistant Examiner* — Mohammad A Rahman

(57) ABSTRACT

A system comprises a first plurality of flip-flop circuits, a second plurality of flip-flop circuits, and a gating control module. At a first processor frequency, gating of clock signals is enabled for the first and second plurality of flip-flop circuits. At a second processor frequency, gating of a first of the clock signals is disabled for the first plurality of flip-flop circuits and gating of a second of the clock signals is enabled for the second plurality of flip-flop circuits.

18 Claims, 3 Drawing Sheets

SYSTEM WITH FEATURE OF SAVING DYNAMIC POWER OF FLIP-FLOP BANKS

BACKGROUND

1. Field

This disclosure relates generally to power saving in a computing system, and more particularly to power savings for flip-flop banks in the system.

2. Related Art

Computing systems commonly having millions of devices to perform computing functions including flip-flop banks which may include large numbers of flip-flops which are typically clocked as are the vast majority of functions in a system. Systems, being typically composed of CMOS transistors, consume most of their power when switching while being clocked. When the flip-flop outputs are not needed, flop-flops waste power when clocked. Thus, it is desirable to disable them when that is the case. This, however, is not always simple to do because it is also important to not sacrifice speed in order to achieve the power savings.

Accordingly there is a need to provide further improvement in achieving power savings of flip-flop banks while avoiding sacrificing speed.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Flip-flop banks are identified for their ability to be clock gated up to a predetermined maximum frequency. Registers store the encoded maximum frequency that clock gating can be enabled for the various flip-flop banks. The flip-flop banks are clocked when they are needed by asserting a clock enable signal at the flip-flop bank when it is to be clocked. If the flip-flop bank is able to be taken from a disabled condition to an enabled condition for the particular clock frequency, then it can be in the disabled condition until it is to be clocked. Thus, each flip-flop bank that is capable of being disabled for the current clock frequency is kept disabled until the clock enable signal is asserted. A flip-flop bank that is not capable of being toggled between an enabled state and a disabled state for the current clock frequency is kept enabled so as to timely respond to the clock signal. This is better understood by reference to the FIGs. and the following written description.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
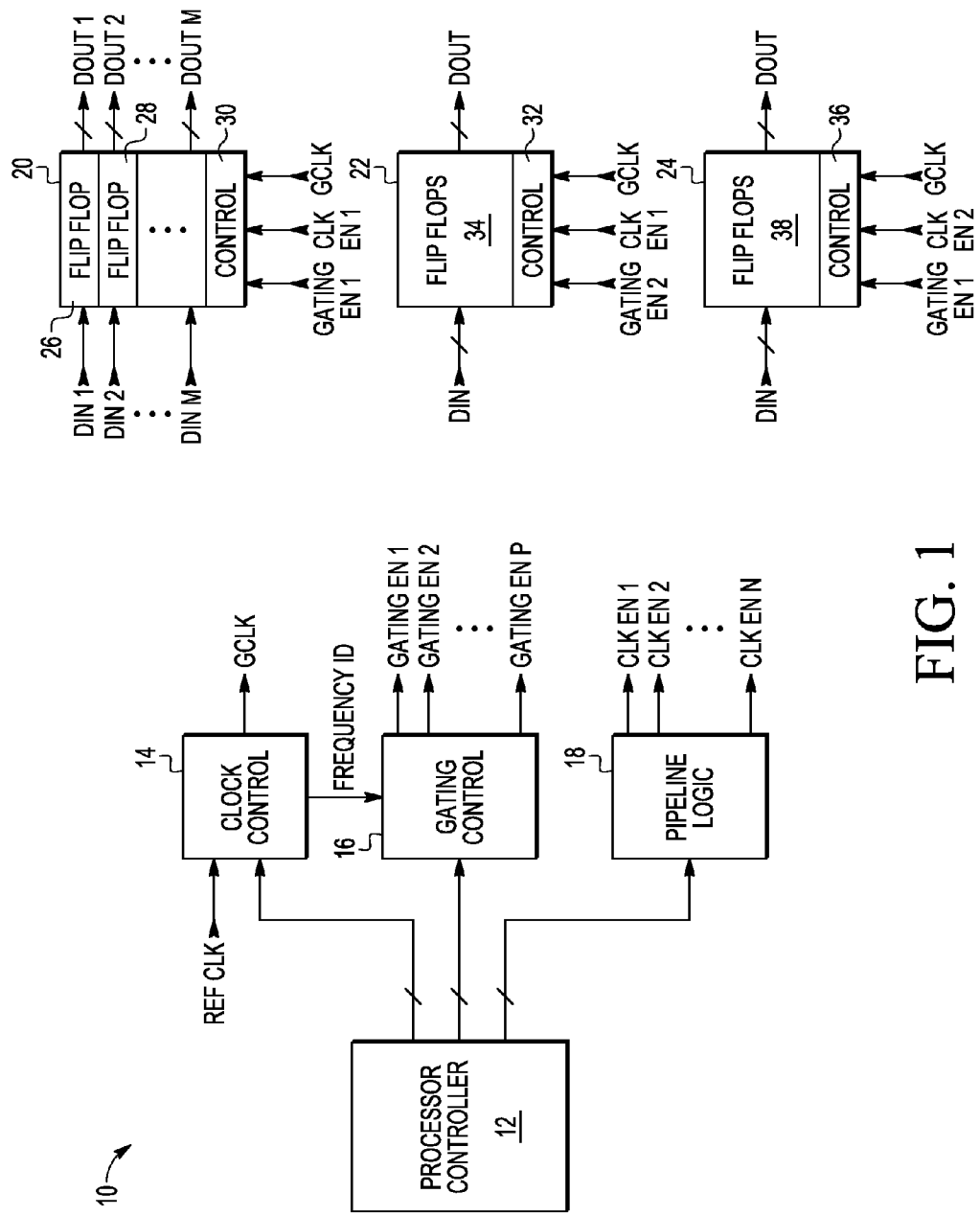
FIG. 1 is a block diagram of a system according to an embodiment.

Shown in FIG. 1 is a system 10 comprising a processor controller 12, a clock control circuit 14 coupled to processor controller 12 that receives a reference clock REF CLK and provides a global clock GCLK and a frequency ID; a gating control circuit 16 that receives the frequency ID from clock control circuit 14 and provides gating EN signals such as gating EN1, gating EN2, and gating ENP; a pipeline logic circuit 18 coupled to processor controller 12 and provides clock enable signals such as CLK EN1, CLK EN2, and CLK ENN; a flip-flop bank 20 coupled to clock control circuit 14 for receiving global clock signal GCLK, gating control circuit 16 for receiving gating EN1, and pipeline logic circuit 18 for receiving clock enable signal CLK EN1; a flip-flop bank 22 coupled to clock control circuit 14 for receiving global clock GCLK, gating control circuit 16 for receiving gating EN2, and pipeline logic circuit 18 for receiving clock enable CLK EN1; and a flip-flop bank 24 coupled to clock control circuit 14 for receiving global clock GCLK, gating control circuit 16 for receiving gating EN1, and pipeline logic circuit 18 for receiving clock enable CLK EN2. Flip-flop bank 20 has a plurality of flip-flops including flip-flops 26 and 28 as well as many more flip-flops. Flip-flop 26 has an input for receiving data in signal DIN1 and an output for providing a data out signal DOUT1. Flip-flop 28 has an input for receiving data in signal DIN2 and an output for providing a data out signal DOUT2. The additional flop-flops each receive a corresponding one of data in signals DINM and each provide a corresponding one of data out signals DOUTM. Flip-flop banks 22 and 24 both receive corresponding data in DIN and data out DOUT signals. Present in system 10 may be many other flip-flop banks, not shown, coupled to clock control circuit 14, gating control circuit 16, and pipeline logic circuit 18 in similar fashion to flip-flop banks 20, 22, and 24. Flip-flop banks 20, 22, and 24 further comprise flip-flop bank control circuits 30, 32, and 36, respectively. Processor controller 12 manages the power and performance of the processor via the clock control circuit 14, gating control circuit 16, and pipeline logic circuit 18 blocks. For example, processor controller 12 can reduce the dynamic power of the processor by instructing the clock control 14 to reduce the frequency of global clock GCLK.

Figure 2:
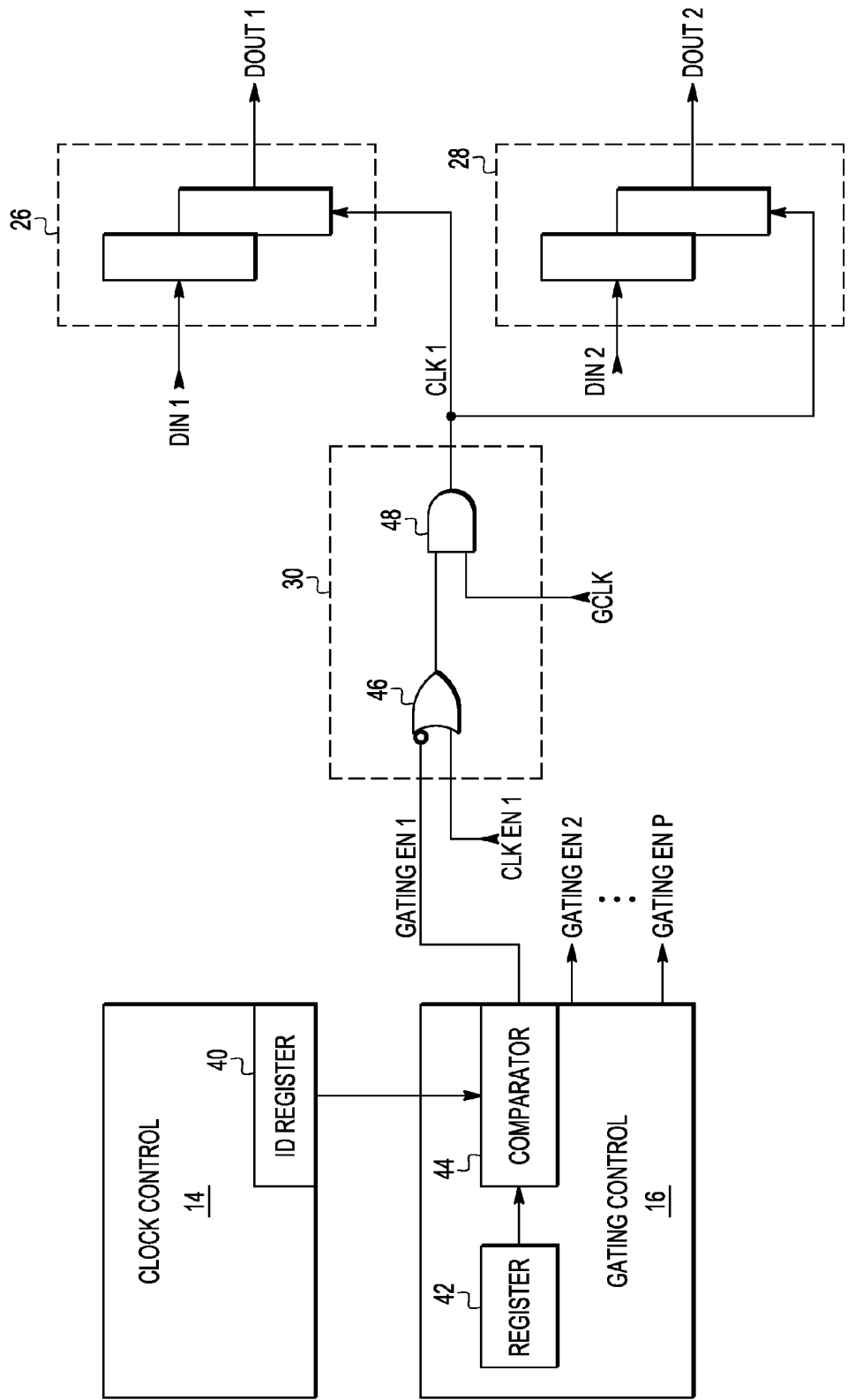
FIG. 2 is combination block diagram and logic diagram of portions of the system of FIG. 1.

Shown in FIG. 2, is a more detailed portion of system 10 comprising a clock control circuit 14 having an ID register 40, gating control circuit 16 having a register 42 and a comparator 44, flip-flop bank control circuit 30 comprising an OR gate 46 having an inverting first input and an AND gate 48, and flip-flops 26 and 28 pictured as master-slave flip-flops having clock input for receiving a clock signal CLK1. Register 42 has an output coupled to an input of comparator 44. Register 42 is associated with flip-flop bank 20 and indicates a frequency, which may be called a threshold frequency, at and below which there is sufficient set-up time for allowing clock enable signal CLK EN1 to prevent global clock signal GCLK from propagating through AND gate 48 to cause flip-flops 26 and 28 as well as the other flip-flops of flip-flop bank 20, from being clocked for the case where it is not necessary for them to be updated while allowing global clock signal GCLK to propagate to the flip-flops of flip-flop bank 20 in sufficient time to update data out signals DOUT1 and DOUT2 as well as the other DOUT signals of flip-flop bank 20 for the case where it is necessary for the flip-flop outputs to be updated. Register 42 may also be associated with other flip-flop banks, such as flip-flop bank 24, that have the same threshold frequency. Gating control circuit 16 has a register such as register 42 for each different threshold frequency that exists among the flip-flop banks. Similarly there may be a comparator such as comparator 44 for each register. OR gate 46 has its first input coupled to the output of comparator 44, a second input that receives clock enable signal CLK EN1, and an output. AND gate 48 has a first input coupled to the output of OR gate 46, a second input that receives global clock GCLK, and an output coupled to a clock input of flip-flop 26, a clock input of flip-flop 28, and the clock inputs of the other flip-flops of flip-flop bank 20.

As an example, operation for flip-flop bank 20 is explained. Global clock GCLK operates at a first frequency, and ID register 40 provides the frequency ID indicative of the frequency of global clock GCLK. Register 42 provides information as to the threshold frequency which is the highest frequency of global clock GCLK at which flip-flop bank 20 can gate GCLK with CLK EN1. If the first frequency does not exceed the threshold frequency, comparator 44 asserts gating EN1 to the inverting input of OR gate 46. OR gate 46 thus provides an output that matches clock enable CLK EN1 provided by pipeline logic circuit 18. Pipeline logic circuit 18 determines when the state of flip-flop bank 20 needs to be updated for use by downstream logic. Gating EN1 is either asserted or deasserted for a given GCLK frequency, whereas CLK EN1 can switch from one clock cycle to the next clock cycle. When flip-flop bank 20 is selected for providing data, clock enable CLK EN1 is asserted which causes OR gate 46 to provide a logic high output to AND gate 48. AND gate 48 then provides an output at the same logic state as global clock GCLK as clock CLK1. Thus when global clock GCLK switches to a logic high, clock signal CLK 1 will switch to a logic high causing data out DOUT1 to be latched at the logic state of data in DIN1 and data out DOUT2 to be latched at the logic state of data in DIN2. Data out DOUT1 and DOUT2 will remain at those logic states until the next rising edge of clock CLK1. If, in the other hand, flip-flop bank 20 is not selected and clock enable CLK EN1 is kept at a logic low, OR gate 46 provides a logic low to AND gate 48 and clock CLK1 is then held at a logic low when global clock GCLK switches to a logic high. This results in flip-flops 26 and 28 remaining in their current states and thus do not consume any switching current. This is also true for all of the flip-flops of flip-flop bank 20.

If the frequency of global clock GCLK is to be increased, ID register 40 is updated with the new GCLK frequency value, and comparator 44 then compares this higher frequency to that represented by register 42. This is performed before the actual increase in frequency of global clock GCLK. If the new frequency is higher than the frequency represented by register 42, comparator 44 de-asserts gating EN1 and OR gate 46 is forced to provide a logic high output regardless of the logic state of clock enable CLK EN1. Thus, every rising edge of global clock GCLK causes flip-flops 26 and 28 as well as all of the flip-flops of flip-flop bank 20 to update the outputs DOUT1, DOUT2, and all of the other flip-flop outputs of flip-flop bank 20. This results in expenditure of switching current even if the flip-flop bank outputs are not going to be used by downstream logic. This is necessary because at the higher clock frequency there is not enough time for CLK EN1 to setup to the rising edge of GCLK. For a frequency increase, clock control circuit 14, waits to increase the frequency of GCLK until after gating EN1 has deasserted at flip-flop bank clock control circuit 30.

The effect of the using AND gate 48 is to save switching power when the flip-flop bank associated with clock enable CLK EN1 is not enabled. If, however, the time associated with generating clock enable CLK EN1, propagating through OR gate 46, and enabling AND gate 48 is too great to ensure that the flip-flops of flip-flop bank 20 can provide the needed DOUT signals, then clock gating is disabled which is achieved by simply holding the input of AND gate 48 coupled to the output of OR gate 46 at a logic high. If the rising edge of CLK EN1 arrives too late with respect to the rising edge of GCLK, the launch of new data out of the flip-flops is delayed which can cause incorrect state to be captured by downstream flip-flops if their data input setup time requirements are not met. Conversely, if the falling edge of CLK EN1 arrives too late in relation to the rising edge of GCLK, then the outputs of the flip-flops will toggle unnecessarily resulting in wasted dynamic power.

The clock enable signals, such as CLK EN1 and CLK EN2, can be used by more than one flip-flop bank when those flip-flop banks provide data at the same time. Similarly, the gating EN signals, such a gating EN1 and gating EN2, can be used by more than one flip-flop bank when they have the same threshold frequency for enabling clock gating.

Figure 3:
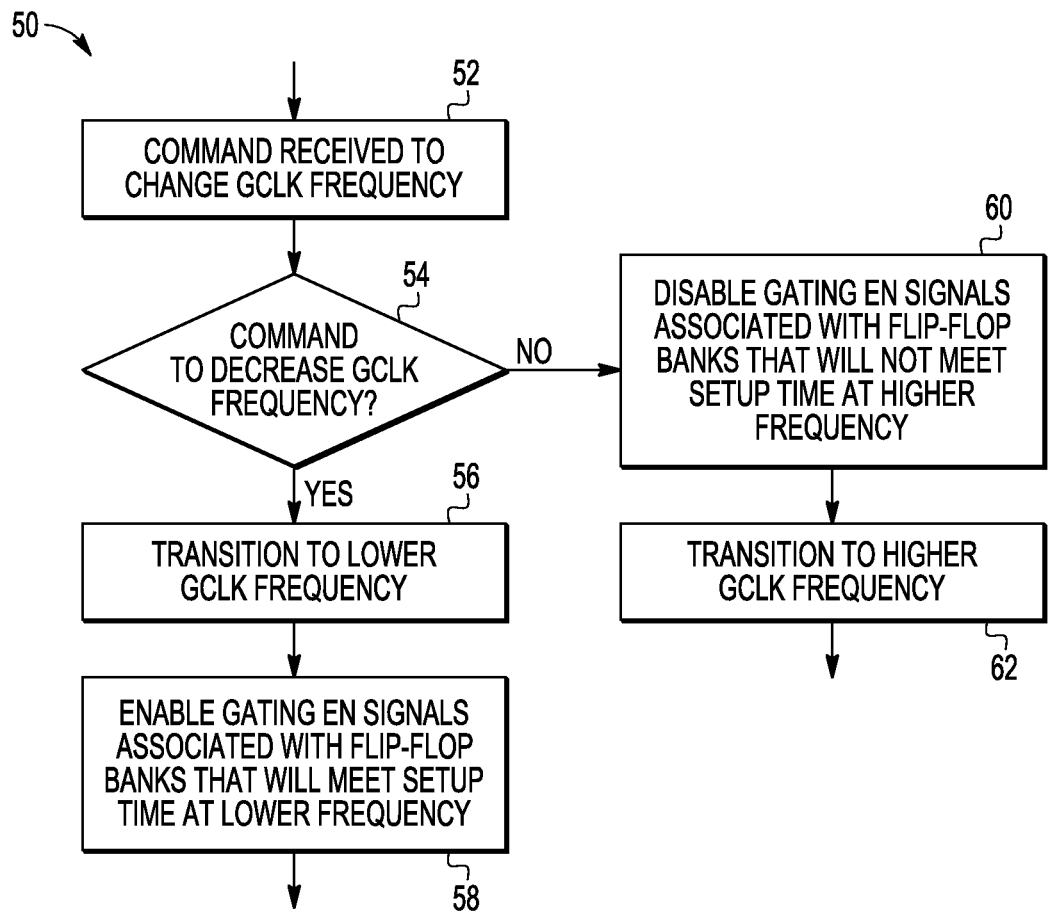
FIG. 3 is a flow diagram helpful in understanding the system of FIG. 1.

Shown in FIG. 3 is a flow chart 50 showing elements of the power saving methodology. At step 52 there is a command to change the frequency of global clock GCLK. At step 54 there is a determination if the command is a decrease in frequency. If it is a decrease in GCLK frequency, then there is the possibility of enabling clock gating for additional flip-flop banks to further reduce dynamic power beyond what is achieved by only reducing the frequency. The frequency must first be decreased in step 56 before clock gating can be enabled for additional flip-flop banks in step 58 because the CLK EN setup time requirement of the additional flip-flop banks requires a larger cycle time. At step 58, the gating EN signals are enabled for the flip-flop banks whose CLK EN signals will meet the required setup time relative to GCLK at the lower frequency. At step 54, if it is determined that the global clock GCLK frequency is to be increased, the gating EN signals are first disabled at step 60 for the flip-flop banks whose CLK EN signals will not meet the required setup time relative to GCLK at the higher frequency. After the gating EN signals have deasserted at the flip-flop bank clock control circuits, the transition of global clock GCLK to the higher frequency is performed at step 62. If the processor frequency is low enough, clock gating can be enabled for all the flip-flop banks. As the processor frequency is increased, the amount of clock gating that is enabled decreases to allow timing to be met at the higher clock frequencies. In this manner, a processor can advantageously enable and disable flip-flop bank clock gating to maximize power savings or performance.

By now it should be appreciated that there has been provided a system having a first plurality of flip-flop circuits. The system further includes a second plurality of flip-flop circuits. The system further includes a gating control module operable to, at a first processor frequency, enable gating of clock signals for the first and second plurality of flip-flop circuits and at a second processor frequency, disable gating of a first of the clock signals for the first plurality of flip-flop circuits and enable gating of a second of the clock signals for the second plurality of flip-flop circuits. The system may have a further characterization by which the gating control module is further operable to disable gating of the first of the clock signals for the first plurality of flip-flop circuits before the processor transitions from the first processor frequency to the second processor frequency. The system may have a further characterization by which the gating control module is further operable to enable gating of the second of the clock signals for the second plurality of flip-flop circuits after the processor transitions from the first processor frequency to the second processor frequency. The system may have a further characterization by which the gating control module is further operable to disable gating of the clock signals for the first and second plurality of flip-flop circuits at a third processor frequency. The system may further include a first register that stores a first frequency identifier to indicate a first frequency at or below which gating can be enabled for the first plurality of flip-flop circuits and a second register that stores a second frequency identifier to indicate a second frequency at or below which gating can be enabled for the second plurality of flip-flop circuits. The system may further include a control module coupled to the first plurality of flip-flop circuits, the control module is configured to receive a gating enable signal, a clock enable signal, and a global clock signal and enable gating of the global clock signal to provide the first of the clock signals for the first plurality of flip-flop circuits based on the gating enable signal and the clock enable signal. The system may have a further characterization by which the first processor frequency is a frequency at which a clock enable signal is available at the control module for a first of the clock signals prior to a global clock signal becoming active at the control module and the second processor frequency is a frequency at which the clock enable signal is not available at the control module for the first of the clock signals prior to the global clock signal becoming active at the control module. The system may have a further characterization by which a gating control module coupled to the control module, the gating control module is configured to receive an indicator of the first processor frequency, compare the indicator of the first processor frequency to a first frequency identifier that indicates a first frequency at or below which gating can be enabled for the first plurality of flip-flop circuits, and set the gating enable signal based on whether the indicator of the first processor frequency is higher than the first frequency identifier.

Also disclosed also is a system including a first plurality of flip-flop circuits. The system further includes a first frequency associated with the first plurality of flip-flop circuits. The system further includes a second plurality of flip-flop circuits. The system further includes a second frequency associated with the second plurality of flip-flop circuits. The system further includes a first controller coupled to the first plurality of flip-flop circuits, wherein the first controller is configured to gate a global clock signal to provide a first clock signal to the first plurality of flip-flop circuits when the first frequency is greater than a processing frequency for the system. The system further includes a second controller coupled to the second plurality of flip-flop circuits, wherein the second controller is configured to gate the global clock signal to provide a second clock signal to the second plurality of flip-flop circuits when the second frequency is greater than the processing frequency for the system. The system may further a processor controller configured to generate a command to change the processing frequency for the system. The system may have a further characterization by which processor controller is further configured to transition to a lower processor frequency before the first controller determines whether to gate the first clock signal when the processing frequency is commanded to decrease. The system may have a further characterization by which the processor controller is further configured to transition to a higher processor frequency after the first controller determines whether to gate the first clock signal when the processing frequency is commanded to increase. The system may have a further characterization by which the first controller is further configured to receive a gating enable signal, a clock enable signal, and the global clock signal and gate the global clock signal to provide the first clock signal based on the gating enable signal and the clock enable signal.

Disclosed also is a method of gating clock signals in a computer processing system including receiving a command to change a processor frequency for the processing system. The method further includes determining whether to increase or decrease the processor frequency based on the command. The method further includes, when the processor frequency is commanded to decrease, transitioning to a lower processor frequency and generating a first gating enable signal, wherein the first gating enable signal controls whether a first clock signal for a first set of flip-flop circuits will be gated. The method may further include, when the processor frequency is commanded to increase, not gating the clock signal when a commanded higher processing frequency is greater than the identified frequency for the first set of flip-flop circuits and transitioning to the commanded higher processing frequency. The method may further include, when the processor frequency is commanded to decrease to a lower processing frequency, the first clock signal is gated when the lower processing frequency is less than or equal to an identified frequency for the first set of flip-flop circuits. The method may further include gating a global clock signal to provide the first clock signal based on the first gating enable signal and a first clock enable signal. The method may further include generating a second gating enable signal, wherein the second gating enable signal controls whether a second clock signal for a second set of flip-flop circuits will be gated and gating the global clock signal to provide the second clock signal to the second set of flip-flop circuits based on the second gating enable signal and a second clock enable signal. The method may further include providing the first clock enable signal as input to a gate with an output coupled to provide a second clock signal to the second set of flip-flop circuits.

Although the invention is described herein with reference to specific embodiments, various modifications and changes can be made without departing from the scope of the present invention as set forth in the claims below. For example, a different mechanism for generating the gating enable signals may be used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system comprising:
  a first plurality of flip-flop circuits associated with a first threshold frequency above which a setup time requirement for the first plurality of flip-flop circuits is not met;
  a second plurality of flip-flop circuits associated with a second threshold frequency above which a setup time requirement for the second plurality of flip-flop circuits is not met; and
  a gating control module operable to:
    enable gating of clock signals for the first and second plurality of flip-flop circuits in response to operation of a processor of the system at a first processor frequency that is below both the first threshold frequency and the second threshold frequency, wherein
the gating control module is configured to:
receive an indicator of the first processor frequency,
compare the indicator of the first processor frequency to an identifier of the first threshold frequency at or below which gating can be enabled for the first plurality of flip-flop circuits, and
set a first gating enable signal for the first plurality of flip-flop circuits based on whether the identifier of the first threshold frequency is higher than the indicator of the first processor frequency; and
disable gating of a first of the clock signals for the first plurality of flip-flop circuits in response to operation of the processor at a second processor frequency that is above the first threshold frequency and enable gating of a second of the clock signals for the second plurality of flip-flop circuits in response to the second processor frequency being below the second threshold frequency.

2. The system of claim 1 wherein the gating control module is further operable to:
disable gating of the first of the clock signals for the first plurality of flip-flop circuits before the processor transitions from the first processor frequency to the second processor frequency.

3. The system of claim 1 wherein the gating control module is further operable to:
enable gating of the second of the clock signals for the second plurality of flip-flop circuits after the processor transitions from the first processor frequency to the second processor frequency.

4. The system of claim 1 wherein the gating control module is further operable to:
disable gating of the clock signals for the first and second plurality of flip-flop circuits at a third processor frequency.

5. The system of claim 1 further comprising:
a first register that stores the identifier of the first threshold frequency at or below which gating can be enabled for the first plurality of flip-flop circuits; and
a second register that stores a second identifier of the second threshold frequency at or below which gating can be enabled for the second plurality of flip-flop circuits.

6. The system of claim 1 wherein the first of the clock signals for the first plurality of flip-flop circuits is the same as the second of the clock signals for the second plurality of flip-flop circuits.

7. The system of claim 1 further comprising:
a control module coupled to the first plurality of flip-flop circuits, the control module is configured to:
receive the first gating enable signal for the first plurality of flip-flop circuits from the gating control module,
receive, a clock enable signal and a global clock signal, and
enable gating of the global clock signal to provide the first of the clock signals for the first plurality of flip-flop circuits based on the first gating enable signal and the clock enable signal.

8. The system of claim 7 wherein
the first processor frequency is a frequency at which a clock enable signal is available at the control module for a first of the clock signals prior to a global clock signal becoming active at the control module, and
the second processor frequency is a frequency at which the clock enable signal is not available at the control module for the first of the clock signals prior to the global clock signal becoming active at the control module.

9. A system comprising:
a first plurality of flip-flop circuits;
a first frequency associated with the first plurality of flip-flop circuits, wherein the first frequency indicates a first threshold frequency above which a setup time requirement for the first plurality of flip-flop circuits is not met;
a second plurality of flip-flop circuits;
a second frequency associated with the second plurality of flip-flop circuits, wherein the second frequency indicates a second threshold frequency above which a setup time requirement for the second plurality of flip-flops is not met;
a first controller coupled to the first plurality of flip-flop circuits, wherein the first controller is configured to:
gate a global clock signal to provide a first clock signal to the first plurality of flip-flop circuits when a processing frequency for the system is below the first frequency, and
a second controller coupled to the second plurality of flip-flop circuits, wherein the second controller is configured to:
gate the global clock signal to provide a second clock signal to the second plurality of flip-flop circuits when the processing frequency for the system is below the second frequency; and
a gating control module coupled to the first controller and to the second controller, the gating control module configured to:
compare the processing frequency for the system to the first frequency at or below which gating can be enabled for the first plurality of flip-flop circuits,
set a first gating enable signal to the first controller based on whether the first frequency is greater than the processing frequency,
compare the processing frequency for the system to the second frequency at or below which gating can be enabled for the second plurality of flip-flop circuits, and
set a second gating enable signal to the second controller based on whether the second frequency is greater than the processing frequency.

10. The system of claim 9 further comprising:
a processor controller configured to generate a command to change the processing frequency for the system.

11. The system of claim 10 wherein the processor controller is further configured to:
transition to a lower processor frequency before the first controller determines whether to gate the first clock signal when the processing frequency is commanded to decrease.

12. The system of claim 10 wherein the processor controller is further configured to:
transition to a higher processor frequency after the first controller determines whether to gate the first clock signal when the processing frequency is commanded to increase.

13. The system of claim 9 wherein the first controller is further configured to:
receive the first gating enable signal from the gating control module,
receive a clock enable signal and the global clock signal, and
gate the global clock signal to provide the first clock signal based on the first gating enable signal and the clock enable signal.

14. A method of gating clock signals in a computer processing system comprising:
- receiving a command to change a processor frequency for the processing system, wherein the processing system comprises
  - a first set of flip-flop circuits associated with a first identified frequency above which a setup time requirement for the first set of flip-flop circuits is not met, and
  - a second set of flip-flop circuits associated with a second identified frequency above which a setup time requirement for the second set of flip-flop circuits is not met;
- determining whether to increase or decrease the processor frequency based on the command; and
- when the processor frequency is commanded to decrease,
  - transitioning to a lower processor frequency,
  - comparing the lower processor frequency to the first identified frequency at or below which gating can be enabled for the first set of flip-flop circuits, and
- generating a first gating enable signal for the first set of flip-flop circuits in response to the lower processor frequency being less than or equal to the first identified frequency, wherein the first gating enable signal controls gating of a first clock signal for the first set of flip-flop circuits.

15. The method of claim 14 further comprising:
- when the processor frequency is commanded to increase to a higher processing frequency,
  - comparing the higher processing frequency to the first identified frequency at or below which gating can be enabled for the first set of flip-flop circuits,
  - not gating the clock signal in response to the higher processing frequency being greater than the first identified frequency for the first set of flip-flop circuits; and
- transitioning to the higher processing frequency.

16. The method of claim 14 further comprising:
gating a global clock signal to provide the first clock signal based on the first gating enable signal and a first clock enable signal.

17. The method of claim 16 further comprising:
generating a second gating enable signal, wherein the second gating enable signal controls whether a second clock signal for a second set of flip-flop circuits will be gated; and
gating the global clock signal to provide the second clock signal to the second set of flip-flop circuits based on the second gating enable signal and a second clock enable signal.

18. The method of claim 16 further comprising:
providing the first clock enable signal as input to a gate with an output coupled to provide a second clock signal to the second set of flip-flop circuits.

* * * * *